Figure 1:
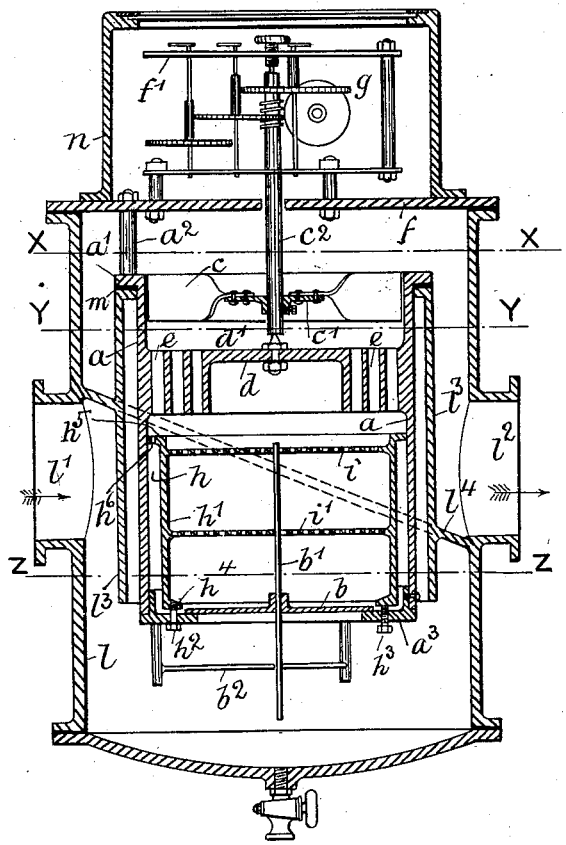

No. 732,385. PATENTED JUNE 30, 1903.
T. THORP.
INFERENTIAL GAS METER.
APPLICATION FILED APR. 30, 1902.
NO MODEL.

WITNESSES
Anna R. McCole
Newport Smith

INVENTOR
T. THORP
By his Attorney
Edward P. Thompson

No. 732,385. Patented June 30, 1903.

UNITED STATES PATENT OFFICE.

THOMAS THORP, OF WHITEFIELD, ENGLAND.

INFERENTIAL GAS-METER.

SPECIFICATION forming part of Letters Patent No. 732,385, dated June 30, 1903.

Application filed April 30, 1902. Serial No. 105,308. (No model.)

*To all whom it may concern:*

Be it known that I, THOMAS THORP, a subject of the King of Great Britain, residing at Moss Bank, Knowsley street, Whitefield, in the county of Lancaster, England, have invented certain new and useful Improvements in Inferential Gas-Meters, of which the following is a specification.

This invention relates to inferential turbine or fan meters for measuring the quantity of gas passed through the meter by registering the speed of the flow of the gas; and it consists in an improved arrangement of the same or combination of the parts thereof, the object of the improvements being to obtain greater accuracy of measurement of the gas passing through the meter than has hitherto been obtained with instruments of this kind.

The general conception underlying the organization comprises a fan-wheel for operating the indicating-needles, means for supplying a current of gas to substantially only one vane of the wheel when the pressure of the gas is about a certain minimum degree of pressure, a device for distributing the gas evenly to all the vanes at a greater pressure, and mechanism for regulating the amount of gas supplied by said means and distributed by said wheel.

More specifically defined, the organization consists of the following elements: a wheel, vanes for the wheel to cause it to serve as a fan-wheel for operating the index-needles, a cylinder in which said wheel is rotary, a second cylinder smaller than the first, a flange upon the second cylinder fitting within the first cylinder and having a hole opposite one of the vanes of said wheel and communicating between the interior of the first cylinder and the annular chamber between the two cylinders, a valve controlling the passage-way to said annular chamber, ports in addition to the said hole for distributing gas evenly to all the vanes of the wheel and controlled by said valve which in turn is controlled automatically and variably by the different pressures of said gas, a solid baffle-plate below the central portion of said wheel and having an extension provided with perforations which are located under said vanes to act as the aforenamed ports and located in that interior space of the first cylinder that is between the wheel and the flange of the second cylinder, perforated baffle-plates located across the interior space of the second cylinder below said solid baffle-plates and below said ports, said second cylinder being axially movable in the first cylinder to and from said vanes, and adjusting-screws for adjusting and holding said second cylinder at different positions, the lower end of said second cylinder being open and said valve being large enough just to pass through said opening, a valve-seat below said valve, so that said seat and said valve normally close the lower end of said first cylinder to the passage of gas into both cylinders and into said annular chamber.

Figure 3:
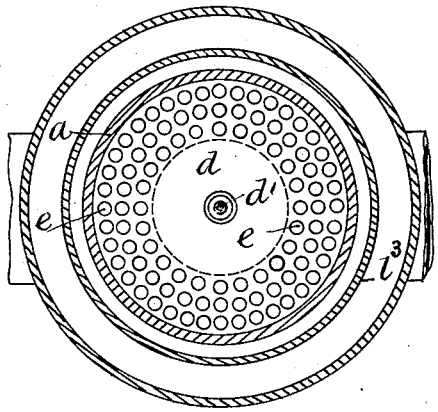
Figure 4:
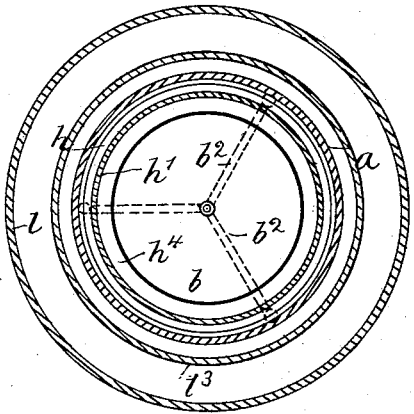
Figure 2:
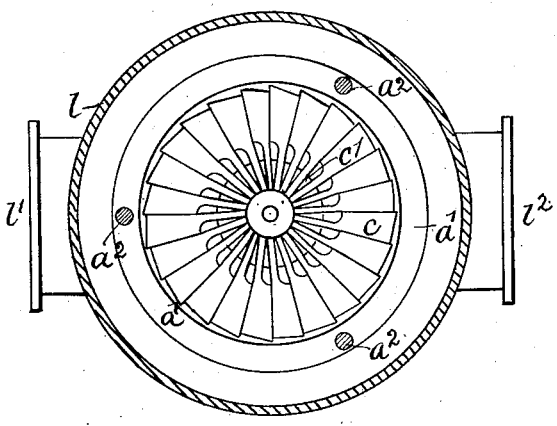

On the drawings annexed hereunto the improved gas-meter is represented, Figure 1 showing a vertical section through the meter; Fig. 2, a horizontal section in line X X of Fig. 1; Fig. 3, a horizontal section on line Y Y, and Fig. 4 a horizontal section on line Z Z.

In carrying out my invention I cause the whole of the gas to be measured to pass through a cylindrical chamber $a$, into which the gas enters through a lightly-loaded non-return valve $b$. The chamber $a$ is provided at the top with a turbine or fan wheel $c$, the vanes of which are arranged around the periphery of a disk $c'$, mounted upon a spindle $c^2$. The vanes of the fan-wheel are set at a suitable angle to the vertical, preferably at an angle of forty-five degrees, and the fan is made as light as possible—for instance, of thin aluminium sheet. Beneath the disk $c'$ is a baffle-plate or shield $d$, the central part of which, of similar size to the disk $c'$, is solid and supports the spindle $c^2$. Preferably the spindle rests upon a hardened steel or iridium center point $d'$, entering a countersunk step in the end of the spindle, which is jeweled for the purpose of reducing the friction to a minimum. Between the central solid part of said baffle-plate $d$ and the wall of the chamber $a$ is an annular margin which contains guide-channels $e$, directing the gas in parallel streams upon the fan-blades. The guide-channels may be formed by casting or drilling a large number of small holes through the thickened part $d'$ of the baffle-plate, or the baffle-plate may be only of the size of the fan-disk $c'$.

Above the fan and connected to the flange $a'$ of the chamber $a$ by pillar-screws $a^2$ is a plate $f$, carrying an index $g$ of any suitable construction, which is actuated from the spindle $c^2$ of the fan and on a dial-plate $f'$ at the top indicates the quantity of gas that passes through the chamber $a$. The spindle $c^2$ has a second bearing on a center pivot fixed in the dial-plate $f'$.

The valve $b$ rests on a seating on the bottom $a^3$ of the chamber $a$ and is provided with a spindle $b'$, guided at the bottom by the ends of three tubular or solid rods $b^2$, this arrangement working with less friction and liability to sticking than a closed-ring bush. Inside the chamber $a$ a liner $h'$ is fixed, forming an annular chamber $h$ around the valve $b$ at the bottom and around the periphery of the chamber $a$, which extends near to the under side of the guide-channels $e$. By means of screws $h^2$ and $h^3$, which are alternately screwed into the bottom $a^3$ and the flange $h^4$ of the liner, the width of the space between these can be adjusted. The liner has an external flange $h^5$ at the top, fitting against the wall of the chamber $a$, and a small hole $h^6$ or several such holes are drilled through the flange $h^5$.

The apparatus thus constructed is placed into a casing having a gas inlet and outlet and so arranged that the gas must pass from the inlet to the outlet through the chamber $a$. Preferably I arrange the casing $l$ in the manner shown on the drawings with the inlet and outlet branches $l'$ and $l^2$ opposite each other and a cylinder $l^3$ in the center, with a partition-plate $l^4$ surrounding the same and dividing the inlet from the outlet, so that the gas has to pass through the cylinder $l^3$ from one to the other. The plate $f$ is fixed to the top of the casing, and the top flange $a'$ of the chamber $a$ is pressed by the pillars $a^2$ upon the top edge of the cylinder $l^3$, a leather washer $m$ being placed between them to make a gas-tight joint. At the top a casing $n$ is fixed, inclosing the index and closed at the top by a glass plate $n'$, through which the dial-plate can be seen.

The action of the apparatus is as follows: When the gas-pressure on the inlet side exceeds that on the outlet side, the valve $b$ is opened. As the valve lifts gas first passes into the annular chamber $h$ and through the hole $h^6$ and the guide-channel $e$ above the same and impinges upon one of the vanes of the fan $c$. This small current of gas overcomes the friction of repose of the fan and causes it to revolve, so that its vanes are acted on more energetically by the current, although small, flowing under pressure than if the same small current were distributed over the whole area of the guide-vanes. When, however, the current is larger, the valve $b$ is lifted farther, and the gas enters the chamber $a$ and passes in parallel streams through the guide-passages $e$ and rotates the fan. To prevent the gas eddying and from ascending only along the wall of the chamber $a$ and acting only on the outer part of the fan-blades, the baffle-plates $i$ $i'$ are arranged, which distribute the current evenly over the whole area of the guide channels and vanes. The quantity of gas first to be passed through the hole or holes $h^6$ can be regulated by adjusting the distance between the flange $h^4$ and bottom $a^3$. By means of these arrangements even very small currents of gas are indicated with accuracy.

The meter can be conveniently rated by passing a predetermined quantity of gas from a holder through the same and regulating the index correspondingly.

I claim as my invention—

1. In an inferential gas-meter the combination of a fan-wheel surrounded by a cylindrical chamber through which the gas passes, said fan-wheel having inclined blades attached to a solid disk, guide-passages for the gas-current parallel to the axle of the fan and opposite the fan-blades, and a solid baffle-plate opposite said disk, the baffle-plate and guide-passages filling the area of said chamber, a valve-seat and valve closing the lower end of said chamber, and perforated baffle-plates located between said valve and the first-named baffle-plate.

2. In an inferential gas-meter the combination of a cylindrical chamber $a$ open at the top, a fan-wheel $c$ in the upper part of said chamber, having inclined blades attached to a solid disk, guide-channels $e$ underneath said blades and a baffle-plate $d$ underneath said disk, an opening in the bottom of said chamber $a$ surrounded by a valve-seating, a liner forming an annular chamber $h$ around the valve-seating and side wall of the chamber $a$, a small hole in the top of said annular chamber, a freely-lifting valve $b$ covering the said opening and a register $g$ operated by the spindle of the fan-wheel.

3. An inferential gas-meter consisting of a casing $l$ formed with inlet and outlet branches, a cylinder $l^3$, and a partition-plate $l^4$, a cylindrical chamber open at the top and having an opening in its bottom surrounded by a valve-seating, said cylindrical chamber being inserted gas-tight into said cylinder, a fan-wheel $c$ in the upper part of said chamber having inclined blades attached to a solid disk, guide-vanes $e$ underneath said blades and a baffle-plate $d$ underneath said disk, a liner forming an annular chamber $h$ around the valve-seating and the side wall of the chamber $a$, a small hole in the top of the said annular chamber, a freely-lifting non-return valve covering the said opening in a cylindrical chamber, and a register $g$ mounted in a casing and fixed to cover of the casing $l$.

4. In a gas-meter, the combination of a wheel, vanes for the wheel to serve as a fan-wheel, a cylinder in which said wheel is rotary, a second cylinder smaller than the first, a flange upon the second cylinder, fitting within the first cylinder, and having a hole opposite one of the vanes of said wheel and communicating between the interior of the first cylinder and the annular chamber between the two cylinders, a valve controlling the passage-way to said annular chamber, ports in addition to the said hole for distributing gas evenly to all the vanes of the wheel, and controlled by said valve, which in turn is controlled automatically and variably by the different volumes of said gas.

5. In a gas-meter, the combination of a wheel, vanes for the wheel to serve as a fan-wheel, a cylinder in which said wheel is rotary, a second cylinder smaller than the first, a flange upon the second cylinder, fitting within the first cylinder, and having a hole opposite one of the vanes of said wheel and communicating between the interior of the first cylinder and the annular chamber between the two cylinders, a valve controlling the passage-way to said annular chamber, ports in addition to the said hole for distributing gas evenly to all the vanes of the wheel, and controlled by said valve which in turn is controlled automatically and variably by the different volumes of said gas, a solid baffle-plate below the central portion of said wheel, and having an extension provided with perforations which are located under said vanes, to act as the aforenamed ports, and located in that interior space of the first cylinder that is between the wheel and the flange of the second cylinder.

6. In a gas-meter, the combination of a wheel, vanes for the wheel to serve as a fan-wheel, a cylinder in which said wheel is rotary, a second cylinder smaller than the first, a flange upon the second cylinder, fitting within the first cylinder, and having a hole opposite one of the vanes of said wheel and communicating between the interior of the first cylinder and the annular chamber between the two cylinders, a valve controlling the passage-way to said annular chamber, ports in addition to the said hole for distributing gas evenly to all the vanes of the wheel, and controlled by said valve, which in turn is controlled automatically and variably by the different volumes of said gas, a solid baffle-plate below the central portion of said wheel, and having an extension provided with perforations which are located under said vanes, to act as the aforenamed ports, and located in that interior space of the first cylinder that is between the wheel and the flange of the second cylinder, and perforated baffle-plates located across the interior of the second cylinder, below said solid baffle-plates and below said ports.

7. In a gas-meter, the combination of a wheel, vanes for the wheel to serve as a fan-wheel, a cylinder in which said wheel is rotary, a second cylinder smaller than the first, a flange upon the second cylinder, fitting within the first cylinder, and having a hole opposite one of the vanes of said wheel and communicating between the interior of the first cylinder and the annular chamber between the two cylinders, a valve controlling the passage-way to said annular chamber, ports in addition to the said hole for distributing gas evenly to all the vanes of the wheel, controlled by said valve which in turn is controlled automatically by the different volumes of said gas, a solid baffle-plate below the central portion of said wheel, and having an extension provided with perforations which are located under said vanes, to act as the aforenamed ports, and located in that interior space of the first cylinder that is between the wheel and the flange of the second cylinder, perforated baffle-plates located across the interior space of the second cylinder, below said solid baffle-plates and below said ports, said second cylinder being axially movable in the first cylinder to and from said vanes.

8. In a gas-meter, the combination of a wheel, vanes for the wheel to serve as a fan-wheel, a cylinder in which said wheel is rotary, a second cylinder smaller than the first, a flange upon the second cylinder, fitting within the first cylinder, and having a hole opposite one of the vanes of said wheel and communicating between the interior of the first cylinder and the annular chamber between the two cylinders, a valve controlling the passage-way to said annular chamber, ports in addition to the said hole for distributing gas evenly to all the vanes of the wheel, and controlled by said valve, which in turn is controlled automatically and variably by the different volumes of said gas, a solid baffle-plate below the central portion of said wheel, and having an extension provided with perforations which are located under said vanes, to act as the aforenamed ports, and located in that interior space of the first cylinder that is between the wheel and the flange of the second cylinder, perforated baffle-plates located across the interior of the second cylinder, below said solid baffle-plates and below said ports, said second cylinder being axially movable in the first cylinder to and from said vanes, and adjusting-screws for adjusting and holding said second cylinder at different positions.

9. In a gas-meter, the combination of a wheel, vanes for the wheel to serve as a fan-wheel, a cylinder in which said wheel is rotary, a second cylinder smaller than the first, a flange upon the second cylinder, fitting within the first cylinder, and having a hole opposite one of the vanes of said wheel and communicating between the interior of the first cylinder and the annular chamber between the two cylinders, a valve controlling the passage-way to said annular chamber, ports in addition to the said hole for distributing gas evenly to all the vanes of the wheel, and controlled by said valve, which in turn is controlled automatically and variably by the different volumes of said gas, a solid baffle-plate below the central portion of said wheel, having an extension provided with perforations which are under said vanes, to act as aforenamed ports, located in that interior space of the first cylinder that is between the wheel and the flange of the second cylinder, perforated baffle-plates located across the interior space of the second cylinder, below said solid baffle-plates and below said ports, said second cylinder being axially movable in the first cylinder to and from said vanes, adjusting-screws for adjusting and holding said second cylinder at different positions, the lower end of said second cylinder being open, and said valve being large enough just to pass through said opening, a valve-seat below said valve so that said seat and said valve normally close the lower end of said first cylinder to the passage of gas into both cylinders and into said annular chamber.

10. In a gas-meter, the combination of a wheel, vanes for the wheel to serve as a fan-wheel, a cylinder in which said wheel is rotary, a second cylinder smaller than the first, a flange upon the second cylinder, fitting within the first cylinder, and having a hole opposite one of the vanes of said wheel and communicating between the interior of the first cylinder and the annular chamber between the two cylinders, a valve controlling the passage-way to said annular chamber, ports in addition to the said hole for distributing gas evenly to all the vanes of the wheel, and controlled by said valve, which in turn is controlled automatically and variably by the different volumes of said gas, the lower end of said cylinder being open, and said valve being large enough just to pass through said opening, a valve-seat below said valve, so that said seat and said valve normally close the lower end of the first said cylinder to the passage of gas into both cylinders and into said annular chamber.

11. In a gas-meter, the combination of a wheel, vanes for the wheel to serve as a fan-wheel, a cylinder in which said wheel is rotary, a second cylinder smaller than the first, a flange upon the second cylinder, fitting within the first cylinder, and having a hole opposite one of the vanes of said wheel and communicating between the interior of the first cylinder and the annular chamber between the two cylinders, a valve controlling the passage-way to said annular chamber, ports in addition to the said hole for distributing gas evenly to all the vanes of the wheel, and controlled by said valve which in turn is controlled automatically and variably by the different volumes of said gas, said second cylinder being axially movable in the first cylinder to and from said vanes.

12. In a gas-meter, the combination of a wheel, vanes for the wheel to serve as a fan-wheel, a cylinder in which said wheel is rotary, a second cylinder smaller than the first, a flange upon the second cylinder, fitting within the first cylinder, and having a hole opposite one of the vanes of said wheel and communicating between the interior of the first cylinder and the annular chamber between the two cylinders, a valve controlling the passage-way to said annular chamber, ports in addition to the said hole for distributing gas evenly to all the vanes of the wheel, and controlled by said valve, which in turn is controlled automatically and variably by the different volumes of said gas, said second cylinder being axially movable in the first cylinder to and from said vane, and adjusting-screws for adjusting and holding said second cylinder at different positions.

13. In a gas-meter, the combination of a wheel, vanes for the wheel to serve as a fan-wheel, a cylinder in which said wheel is rotary, a second cylinder smaller than the first, a flange upon the second cylinder, fitting within the first cylinder, and having a hole opposite one of the vanes of said wheel and communicating between the interior of the first cylinder and the annular chamber between the two cylinders, a valve controlling the passage-way to said annular chamber, ports in addition to the said hole for distributing gas evenly to all the vanes of the wheel, and controlled by said valve, which in turn is controlled automatically and variably by the different volumes of said gas, a solid baffle-plate below the central portion of said wheel, and having an extension provided with perforations which are located under said vanes, to act as the aforenamed ports, and located in that interior space of the first cylinder that is between the wheel and the flange of the second cylinder, the lower end of said second cylinder being open, and said valve being large enough just to pass through said opening, a valve-seat below said valve so that said seat and said valve normally close the lower end of said first cylinder to the passage of gas into both cylinders and into said annular chamber.

14. In a gas-meter, the combination of a wheel, vanes on said wheel, a cylinder in which said wheel is rotary, a solid baffle-plate under the central portion of said wheel, and perforated at that portion which is under the vanes, and other baffle-plates perforated all over, and located under the first-named baffle-plate, all said baffle-plates being located within said cylinder, and a valve controlling the admission of gas to said cylinder, a second cylinder within the first to form an annular chamber between two cylinders, a flange at the upper end of the second cylinder to cut off said annular chamber from the first-named cylinder, except for a hole in one portion of said flange, a valve-seat and valve closing the lower end of the first cylinder, the lower end of the second cylinder being spaced from said seat to permit a port from said valve to said annular chamber.

15. In a gas-meter, the combination of a wheel, vanes on said wheel, a cylinder in which said wheel is rotary, a solid baffle-plate under the central portion of said wheel, and perforated at that portion which is under the vanes, and other baffle-plates perforated all over, and located under the first-named baffle-plate, all said baffle-plates being located within said cylinder, a valve controlling the admission of gas to said cylinder, a second cylinder within the first to form an annular chamber between the two cylinders, a flange at the upper end of the second cylinder to cut off said annular chamber from the first-named cylinder, except for a hole in one portion of said flange, a valve-seat and valve closing the lower end of the first cylinder, the lower end of the second cylinder being spaced from said seat to permit a port from said valve to said annular chamber, and adjusting-screws passing through said seat into the lower end of said second cylinder.

16. In a gas-meter, the combination of a wheel, vanes on said wheel, a cylinder in which said wheel is rotary, a solid baffle-plate under the central portion of said wheel, and perforated at that portion which is under the vanes, and other baffle-plates perforated all over, and located under the first-named baffle-plate, all said baffle-plates being located within said cylinder, a valve controlling the admission of gas to said cylinder, a second cylinder within the first to form an annular chamber between the two cylinders, a flange at the upper end of the second cylinder to cut off said annular chamber from the first-named cylinder, except for a hole in one portion of said flange, a valve-seat and valve closing the lower end of the first cylinder, the lower end of the second cylinder being spaced from said seat to permit a port from said valve to said annular chamber, and adjusting-screws passing through said seat into the lower end of said second cylinder, which has an opening large enough for just the passage of said valve, which is so proportioned that when the gas raises the valve, there is first formed a port for the gas only into said annular chamber, and when the valve is sufficiently lifted, there is a passage-way both into the said annular chamber, and into said second cylinder.

17. In a gas-meter, means for feeding gas to the working element of said meter, consisting of a first cylinder, a second cylinder smaller than the first and within the first and having an opening in the lower end and spaced from the end of the first cylinder, the construction being such that there is a passage-way from the end of the first cylinder, which has an opening and valve-seat, to said working element, a valve located normally on said valve-seat and of about the same size as the opening in the lower end of the second cylinder, a guiding-stem for said valve, the above-named elements being so proportioned that when the valve is on the seat, there is no passage for the gas to either cylinder, but when the valve is lifted a predetermined distance, there is a passage to said annular chamber, but not into said second cylinder, but when the valve is further lifted, there is a passage not only into said annular chamber, but into said second cylinder.

18. In a gas-meter, means for feeding gas to the working element of said meter, consisting of a first cylinder, a second cylinder smaller than the first and within the first and having an opening in the lower end and spaced from the end of the first cylinder, the construction being such that there is a passage-way from the end of the first cylinder, which has an opening and valve-seat, to said working element, a valve located normally on said valve-seat and of about the same size as the opening in the lower end of the second cylinder, a guiding-stem for said valve, the above-named elements being so proportioned that when the valve is on the seat, there is no passage for the gas to either cylinder, but when the valve is lifted a predetermined distance, there is a passage to said annular chamber, but not into said second cylinder, but when the valve is further lifted, there is a passage not only into said annular chamber, but into said second cylinder, and perforated baffle-plates extending across the interior of said second cylinder, the stem of said valve having bearings in said baffle-plate.

19. In a gas-meter, the combination of a wheel, vanes for the wheel to serve as a fan-wheel, a cylinder in which said wheel is rotary, a second cylinder smaller than the first, a flange upon the second cylinder, fitting within the first cylinder, and having a hole opposite one of the vanes of said wheel and communicating between the interior of the first cylinder and the annular chamber between the two cylinders, a valve controlling the passage-way to said annular chamber, ports in addition to the said hole for distributing gas evenly to all the vanes of the wheel, and controlled by said valve, which in turn is controlled automatically and variably by the different volumes of said gas, a cylinder 1 closed at both ends and having an admission and exhaust port respectively at opposite sides of said cylinder 1, and a web within said meter cutting off the passage-way from the admission to the exhaust-port.

In testimony whereof I have hereunto set my hand in the presence of two witnesses.

THOMAS THORP.

Witnesses:
CARL BOLLÉ,
ROBERT COLLINGE.